United States Patent
Lewis et al.

(10) Patent No.: US 7,527,302 B2
(45) Date of Patent: May 5, 2009

(54) PIPE FITTING AND ASSOCIATED METHODS AND APPARATUS

(75) Inventors: Eric Wayne Lewis, Charlotte, NC (US); Julie Starnes Parker, Waxhaw, NC (US)

(73) Assignee: Charlotte Pipe and Foundry Company, Charlotte, NC (US)

( * ) Notice: Subject to any disclaimer, the term of this patent is extended or adjusted under 35 U.S.C. 154(b) by 149 days.

(21) Appl. No.: 10/923,227

(22) Filed: Aug. 20, 2004

(65) Prior Publication Data

US 2005/0093292 A1    May 5, 2005

Related U.S. Application Data

(60) Provisional application No. 60/496,808, filed on Aug. 21, 2003.

(51) Int. Cl.
*F16L 47/02* (2006.01)
*F16L 47/06* (2006.01)
*F16L 47/16* (2006.01)

(52) U.S. Cl. .............. 285/296.1; 285/286.1; 285/294.3

(58) Field of Classification Search .............. 285/285.1, 285/286.1, 286.2, 292.1, 293.1, 294.1, 294.3, 285/294.4, 296.1; 264/267, 268, 269
See application file for complete search history.

(56) References Cited

U.S. PATENT DOCUMENTS

| | | | |
|---|---|---|---|
| 261,191 A * | 7/1882 | Walker | 285/292.1 |
| 526,097 A * | 9/1894 | Anderson | 285/292.1 |
| 1,277,977 A * | 9/1918 | Mann | 285/286.2 |
| 1,461,482 A * | 7/1923 | Hahn | 285/285.1 |
| 2,461,337 A * | 2/1949 | Miskimen | 285/286.1 |
| 2,770,476 A * | 11/1956 | Cleverly | 277/603 |
| 2,776,151 A | 1/1957 | Harkenrider | |
| 2,968,821 A | 1/1961 | Morin et al. | |
| 3,018,519 A | 1/1962 | Morin et al. | |
| 3,245,701 A | 4/1966 | Leopold, Jr. et al. | |
| 3,858,914 A | 1/1975 | Karie et al. | |
| 4,093,280 A | 6/1978 | Yoshizawa et al. | |
| 4,241,878 A * | 12/1980 | Underwood | 239/591 |
| 4,339,406 A | 7/1982 | Underwood | |
| 4,363,504 A | 12/1982 | De Feo et al. | |
| 4,377,894 A | 3/1983 | Yoshida | |
| 4,445,715 A * | 5/1984 | Inoue et al. | 285/54 |
| 4,842,540 A | 6/1989 | Endo et al. | |
| 4,905,766 A | 3/1990 | Dietz et al. | |
| 5,109,929 A | 5/1992 | Spears | |
| 5,333,650 A * | 8/1994 | Folkman | 138/109 |
| 5,366,257 A | 11/1994 | McPherson et al. | |
| 5,406,983 A * | 4/1995 | Chambers et al. | 138/109 |

(Continued)

FOREIGN PATENT DOCUMENTS

JP          361290019 A      12/1986

*Primary Examiner*—James M Hewitt
(74) *Attorney, Agent, or Firm*—Alston & Bird LLP

(57) ABSTRACT

A pipe fitting includes a polymeric body molded into and fixedly connected to a metallic body, so that the metallic body extends around the polymeric body. The polymeric body extends around and is contiguous with a passageway of the pipe fitting, and at least partially defines a first opening of the passageway that is for being mated to a polymeric pipe. The metallic body extends around and is contiguous with the passageway, and at least partially defines a second opening of the passageway that is for being mated to a metallic pipe.

20 Claims, 12 Drawing Sheets

U.S. PATENT DOCUMENTS

| | | |
|---|---|---|
| 5,437,481 A | 8/1995 | Spears et al. |
| 5,551,141 A | 9/1996 | De'Ath et al. |
| 5,655,299 A * | 8/1997 | Lindahl .................. 29/890.051 |
| 5,851,472 A | 12/1998 | Kashiyama |
| 5,861,120 A | 1/1999 | Yagi et al. |
| 5,901,987 A * | 5/1999 | Godeau ................. 285/148.19 |
| 5,954,371 A | 9/1999 | Koke et al. |
| 6,000,436 A * | 12/1999 | Auvil et al. ................. 138/143 |
| 6,070,915 A * | 6/2000 | Luo ........................ 285/125.1 |
| 6,099,975 A | 8/2000 | Peterson et al. |
| 6,135,508 A * | 10/2000 | Genoni et al. .............. 285/21.2 |
| 6,148,581 A | 11/2000 | Separautzki |
| 6,378,912 B1 | 4/2002 | Condon et al. |
| 6,460,432 B1 | 10/2002 | Julian et al. |
| 6,521,160 B2 | 2/2003 | Suzuki |
| 2003/0146620 A1 | 8/2003 | Young et al. |
| 2004/0155457 A1* | 8/2004 | Mejlhede et al. ........... 285/21.1 |

* cited by examiner

US 7,527,302 B2

PIPE FITTING AND ASSOCIATED METHODS AND APPARATUS

CROSS-REFERENCE TO RELATED APPLICATION

The present application claims the benefit of U.S. Provisional Application 60/496,808, which was filed Aug. 21, 2003, and is incorporated herein by reference.

BACKGROUND OF THE INVENTION

One aspect of the present invention relates to a pipe fitting for connecting between dissimilar pipes, or the like, and, more particularly, for connecting between metallic and polymeric pipes, or the like.

It is common for substances to flow between metallic and polymeric pipes that are connected by a pipe fitting. As a more specific example, water is often supplied from an upstream metallic pipe to a downstream polymeric pipe that is the inlet of a plumbing fixture or appliance, such as a faucet or the like. It is critical for this type of pipe fitting to remain watertight, often for very many years. Nonetheless, it is common for some of these pipe fittings to occasionally fail, since they are typically exposed to many cycles of stress caused by variations in the pressure and/or temperature of the water being supplied.

A known pipe fitting for connecting between metallic and polymeric pipes is formed by separately manufacturing generally cylindrical polymeric and metallic bodies, and then connecting the bodies to one another. The polymeric body is inserted into an annular opening of the metallic body, and then the annular edge of the opening is bent inward (e.g., crimped) to hold the polymeric body in the metallic body. For this known pipe fitting, the polymeric body extends around a passageway of the pipe fitting and defines a first opening to the passageway, and the first opening is for being mated to the polymeric pipe. In addition, the metallic body extends around the polymeric body and defines a second opening to the passageway, and the second opening is for being mated to the metallic pipe. These pipe fittings have been known to fail at the crimp, because the crimping can weaken the metallic body.

Accordingly, there is a need in the industry for improved pipe fittings for connecting between metallic and polymeric pipes.

BRIEF SUMMARY OF SOME ASPECTS OF THE INVENTION

Aspects of the present invention include the provision of an improved pipe fitting that is capable of connecting between pieces of plumbing such as, but not limited to, metallic and polymeric pipes, and the provision of methods and apparatus for making pipe fittings.

In accordance with one aspect of the present invention, a composite pipe fitting includes a polymeric body that is molded to and fixedly connected to a metallic body. It is preferred for at least a portion of the polymeric body to be molded into the metallic body such that the metallic body extends around the polymeric body. The polymeric body extends around and is contiguous with a passageway of the pipe fitting. The polymeric body also at least partially defines a forward opening of the passageway that is for being mated to a piece of plumbing such as, but not limited to, a polymeric pipe. The metallic body at least partially defines a rearward opening of the passageway that is for being mated to a piece of plumbing such as, but not limited to, a metallic pipe. It is preferred the metallic body to extend around and be contiguous with the passageway.

In accordance with one aspect of the present invention, restrictions in relative movement between the metallic and polymeric bodies are advantageously facilitated by virtue of contact therebetween. For example, it is preferred for at least one protrusion of one of the bodies to be mated with at least one shoulder, cavity or hole of the other body in a manner that restricts relative movement between the bodies. It is preferred for at least one of the protrusions and corresponding cavities (e.g., grooves) to be annular and contain an o-ring, for sealing purposes.

According to one aspect of the present invention, the polymeric body does not extend for the entire length of the metallic body. In accordance with one embodiment of the present invention, a forward end of the polymeric body, that defines the forward opening, is readily viewable, whereas the other, rearward end of the polymeric body is positioned between the ends of the metallic body and is, therefore, substantially hidden from view.

In accordance with one aspect of the present invention, the polymeric body is formed by injecting molding material through a hole in the sidewall of the metallic body. In accordance with some embodiments of the present invention, the sidewall is cylindrical, and the hole extends radially away from the axis which the cylindrical sidewall extends around. The hole in the sidewall of the metallic body is preferably for receiving the molding material from a gate in a jig that holds the metallic body in a predetermined manner. It is preferred for the hole to be positioned between the forward, viewable end of the polymeric body and the substantially hidden, rearward end of the polymeric body. Preferably the hole is closer to the rearward end of the polymeric body than it is to the forward end of the polymeric body. This advantageously helps to ensure that the polymeric body is fully and properly formed within the metallic body. It is preferred for the polymeric body to include a protruding portion that at least partially occupies the hole, which further secures the bodies to one another. Each of the composite fittings can include at least one additional hole, which is for having molding material injected thereinto, and associated structures.

In accordance with one aspect of the present invention, the readily viewable forward end face of the polymeric body includes indicia.

Further to one aspect of the present invention, the metallic body of the composite fitting includes at least one spiral thread, which can be internal or external, for facilitating connection of the composite fitting to a piece of plumbing by twisting. The piece of plumbing preferably includes metallic thread(s) for mating with the thread(s) of the metallic body. The metallic body can include an outer polygonal portion for being engaged by a wrench, for facilitating the twisting.

In accordance with one aspect of the present invention, an internal stop, which is preferably annular and part of the polymeric body, protrudes into the passageway for engaging an end of the polymeric pipe, or other piece of plumbing, inserted into composite fitting, for arresting relative movement between the composite fitting and the piece of plumbing (e.g., polymeric pipe). Likewise, it is preferred for an internal or external stop, which is preferably annular and part of the metallic body, to be available for engaging an end of the metallic pipe or fitting, or other piece of plumbing, installed to the composite fitting, for arresting relative movement between the composite fitting and the piece of plumbing (e.g., metallic pipe or fitting).

In accordance with one aspect of the present invention, the composite fitting is advantageously compact as compared to comparable conventional fittings.

Other aspects and advantages of the present invention will become apparent from the following.

BRIEF DESCRIPTION OF THE DRAWINGS

Figure 1:
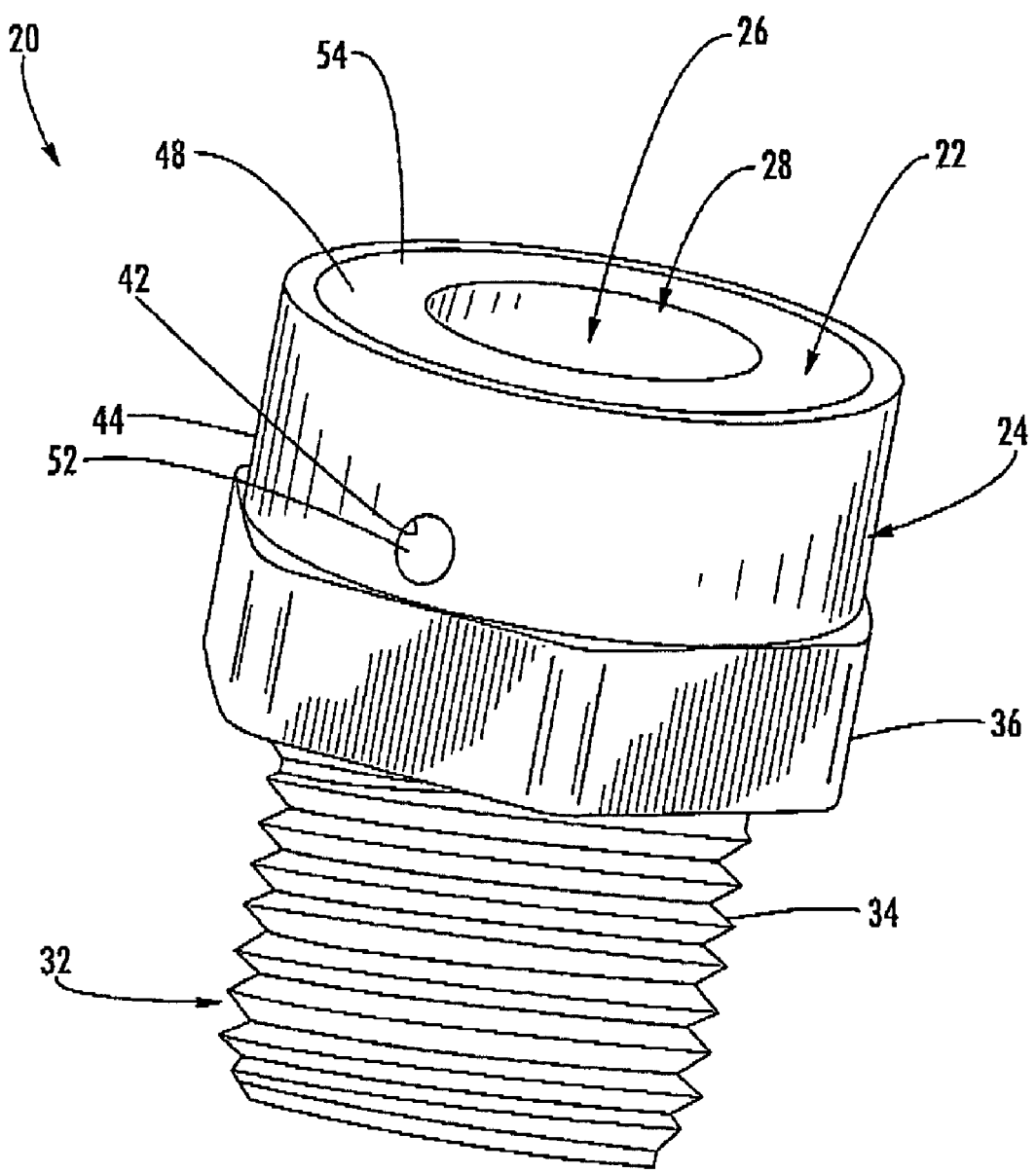
Figure 2:
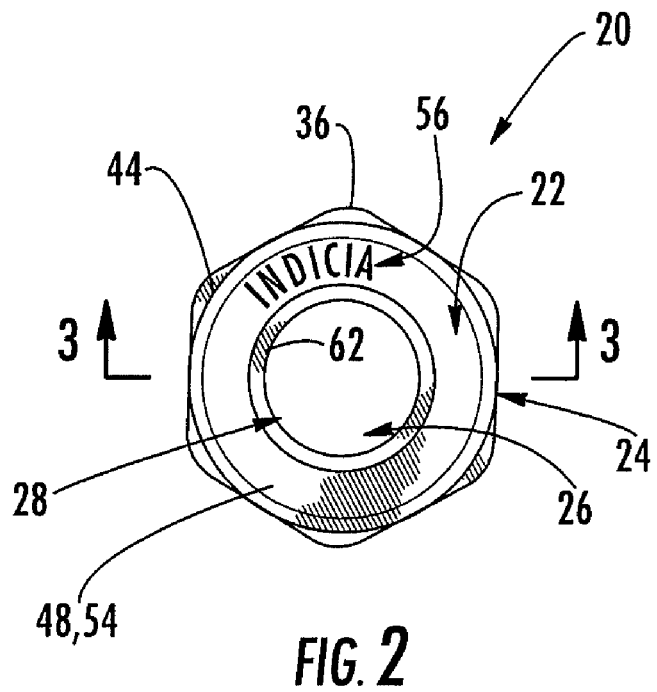
Figure 3:
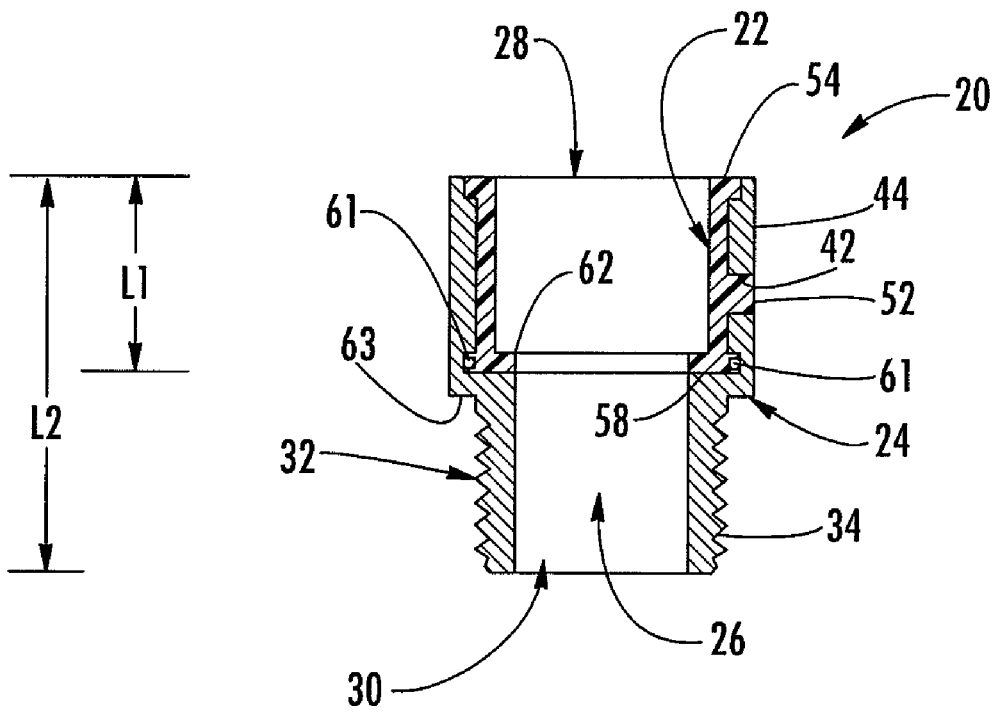
Figure 4:
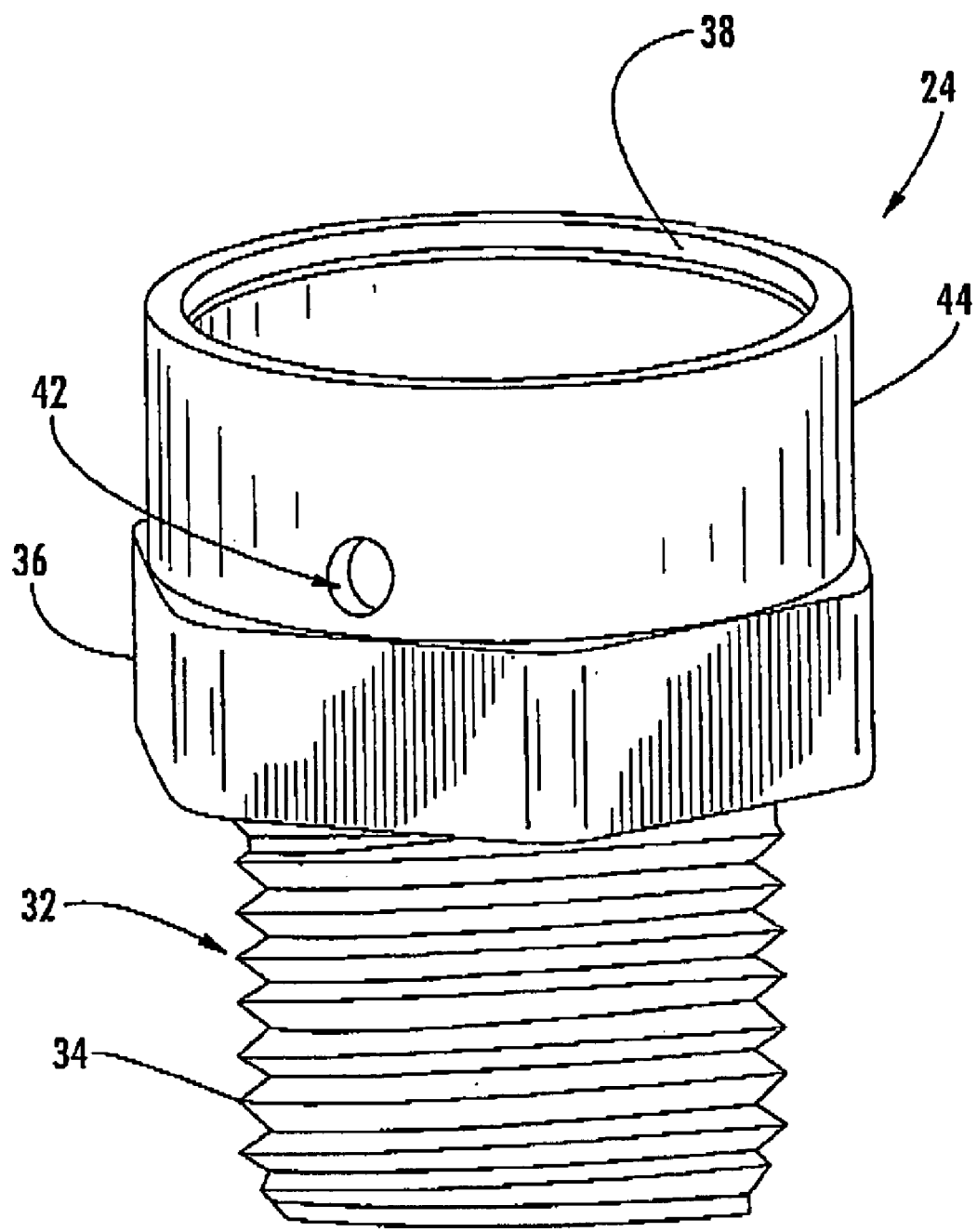
Figure 5:
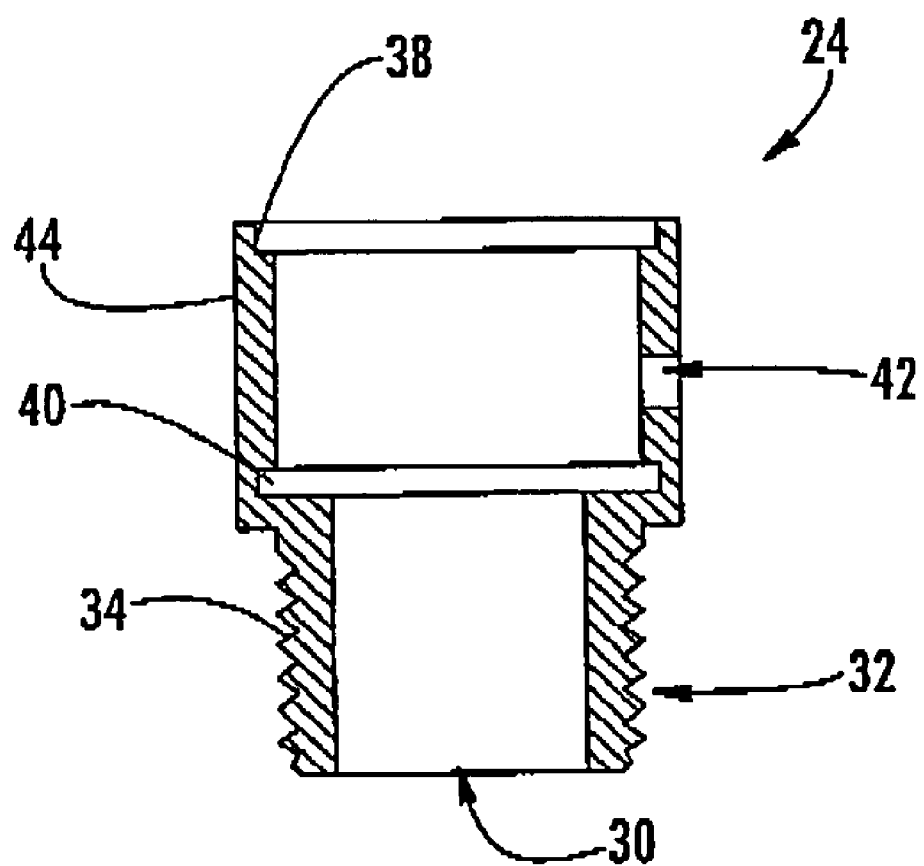
Figure 6:
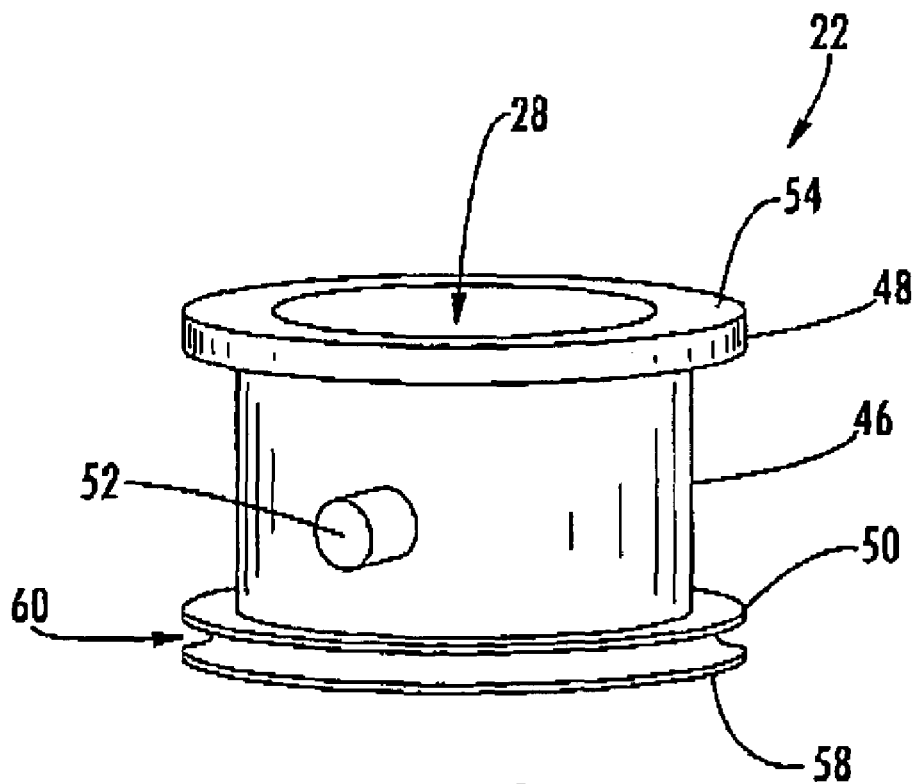
Figure 7:
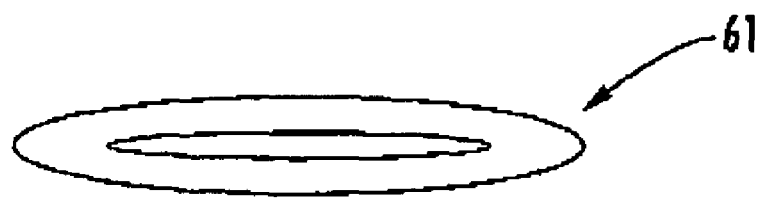
Figure 8:
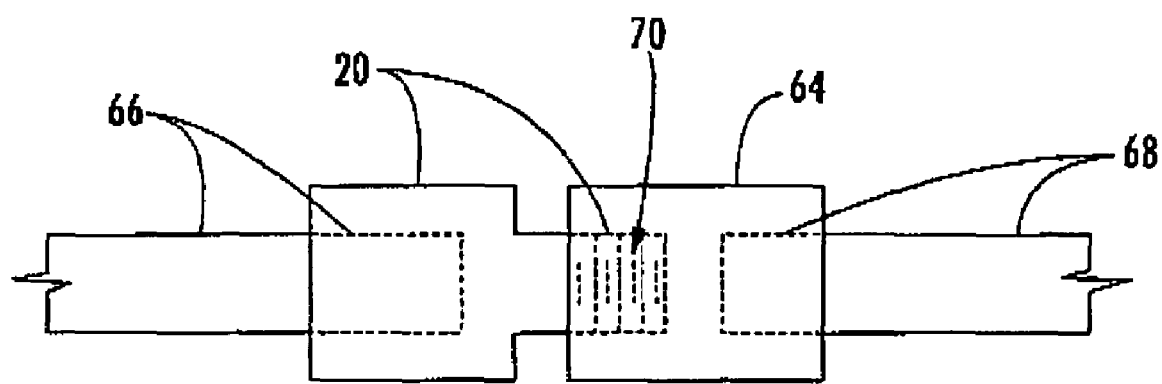
Figure 9:
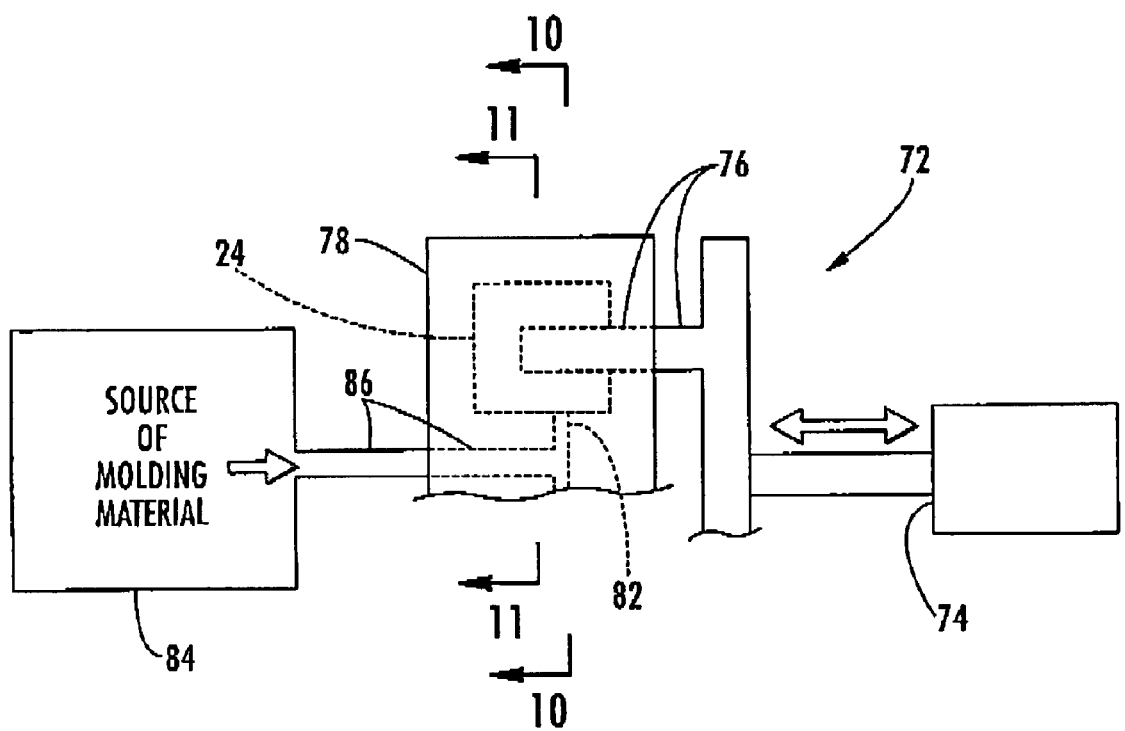
Figure 11:
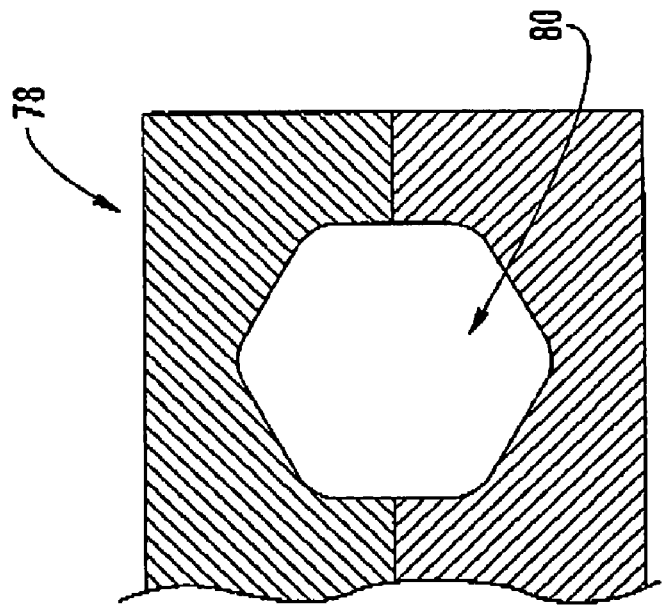
Figure 10:
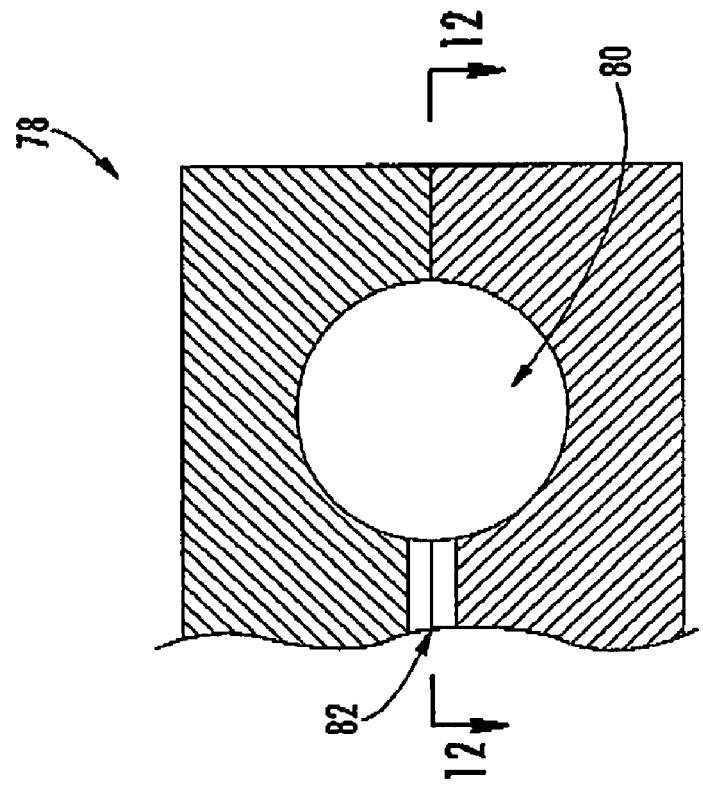
Figure 12:
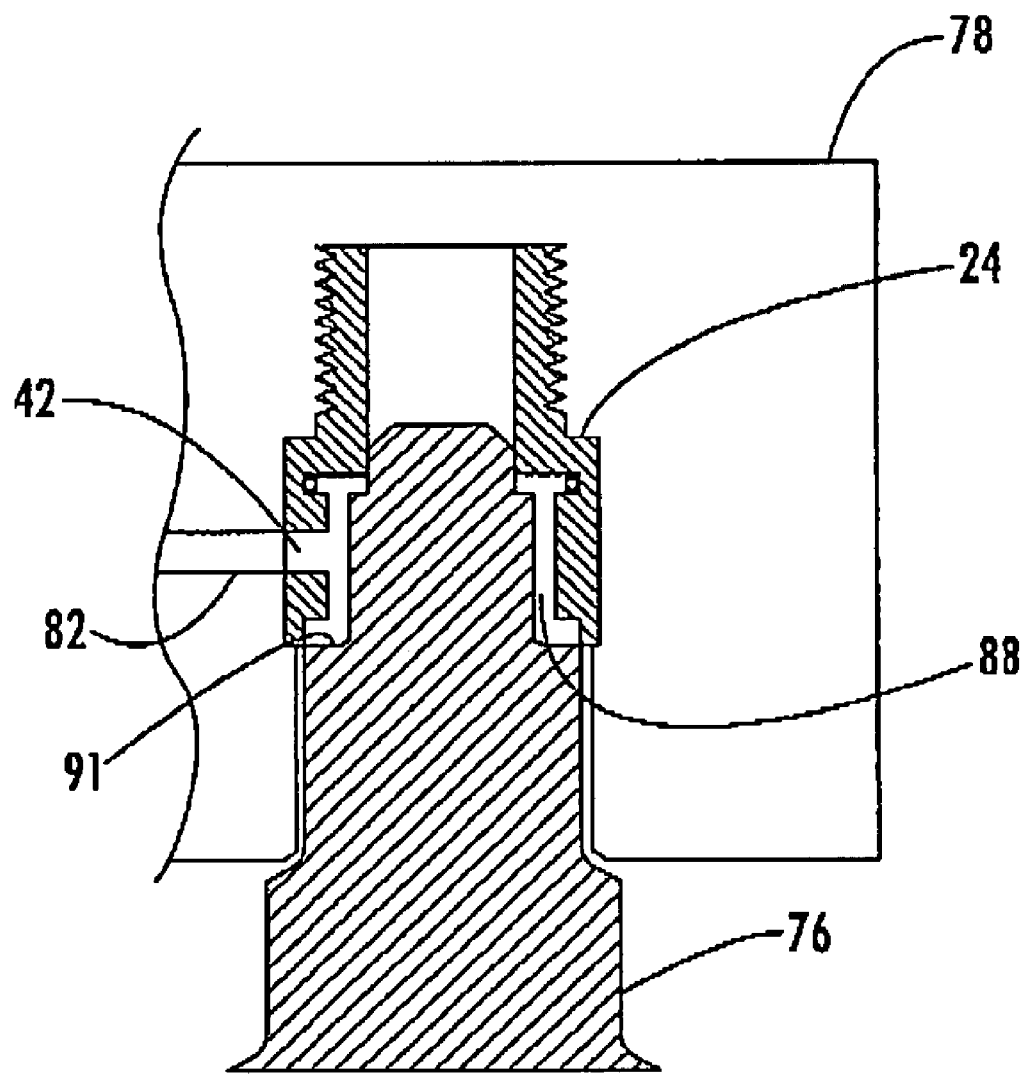
Figure 13:
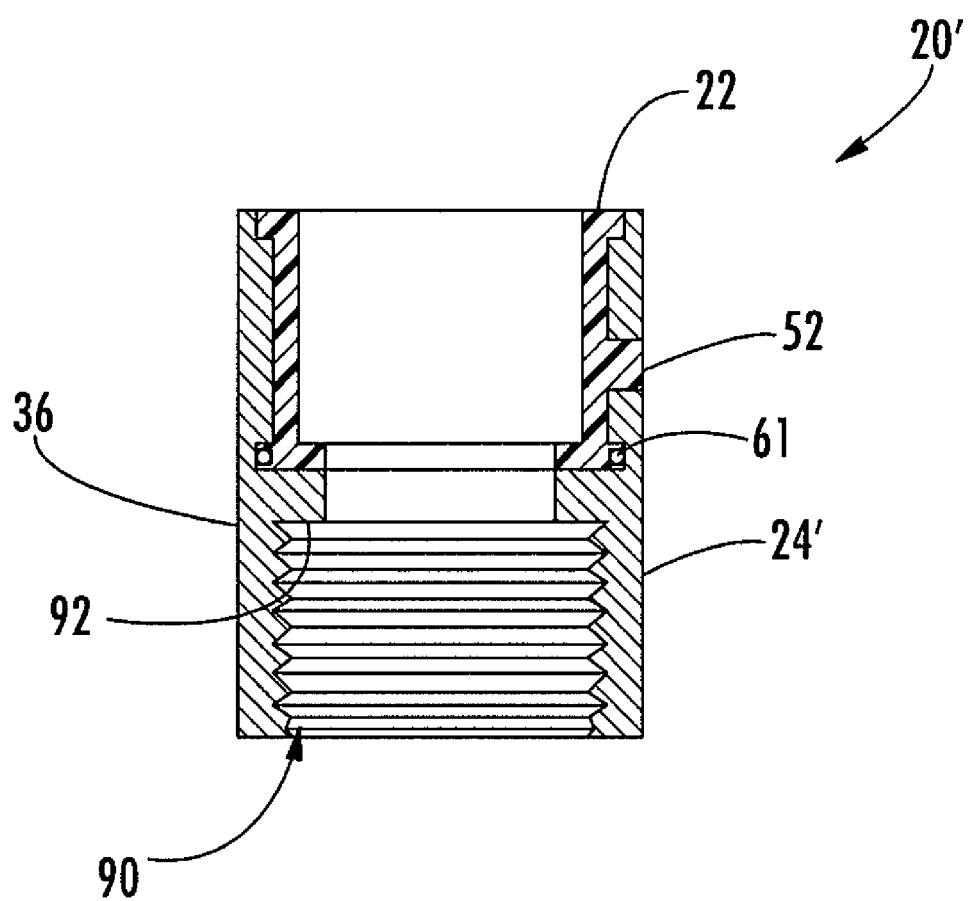
Figure 14:
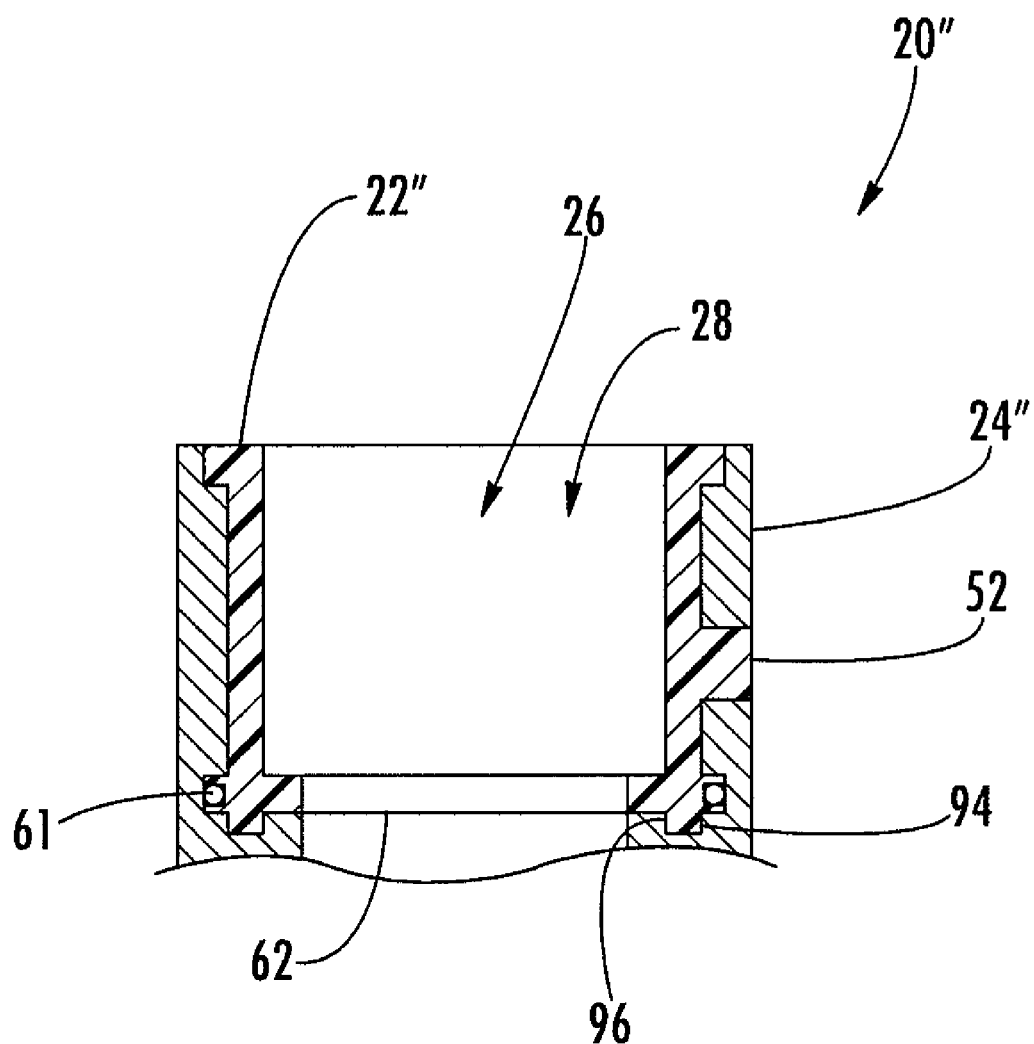
Figure 15:
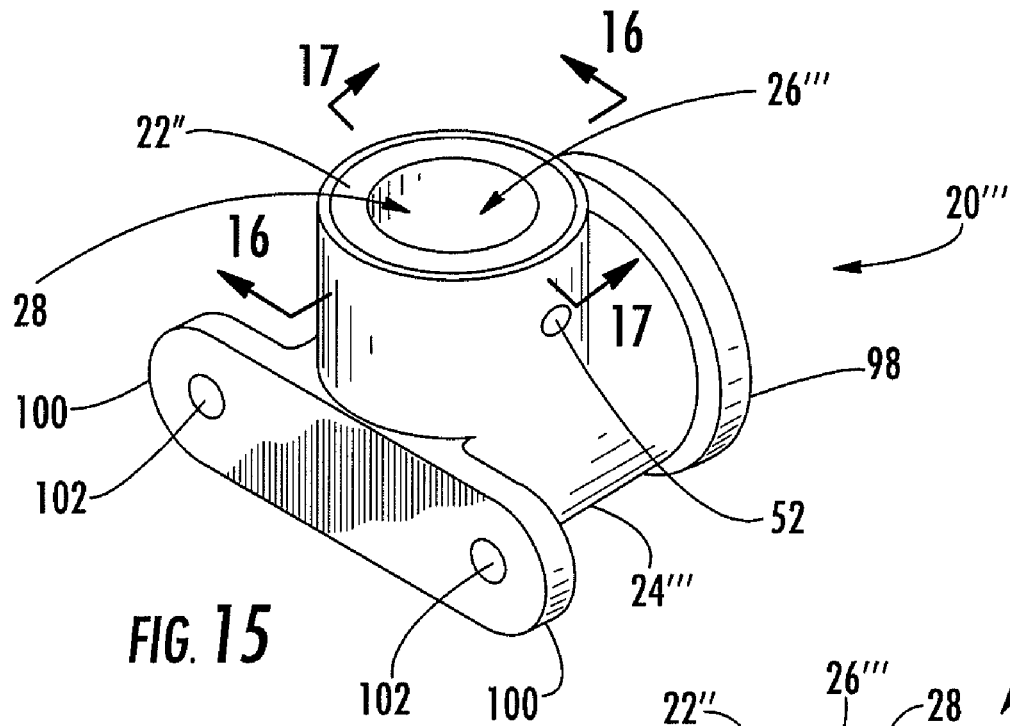
Figure 16:
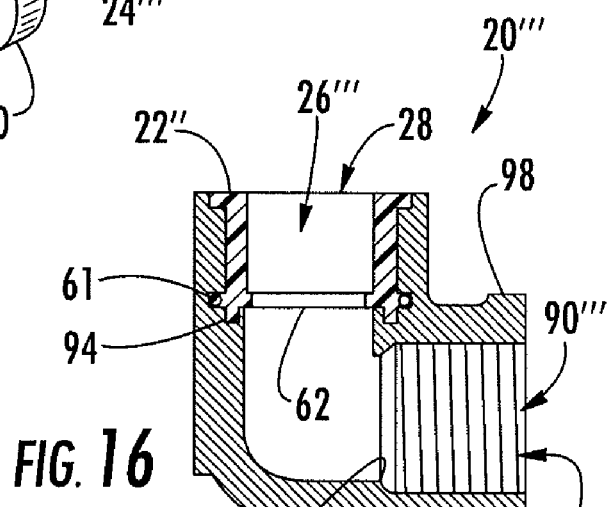
Figure 17:
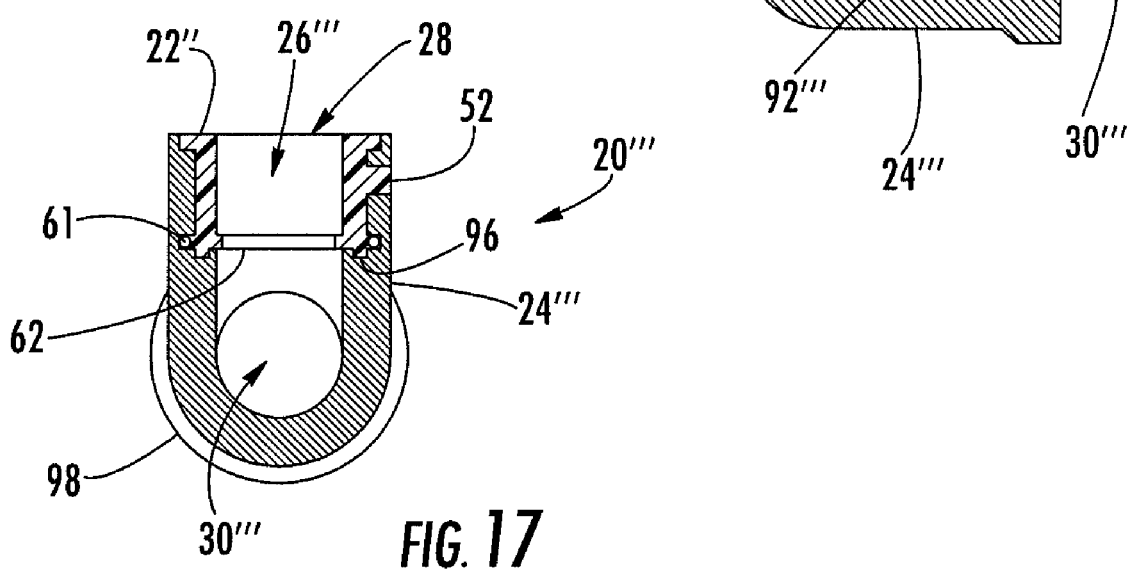

Having thus described the invention in general terms, reference will now be made to the accompanying drawings, which are not necessarily drawn to scale, and wherein:

FIG. 1 is a pictorial view of a composite fitting that is for connecting between polymeric and metallic pipes, in accordance with an exemplary embodiment of the present invention;

FIG. 2 is an elevational view of the front end of composite fitting of FIG. 1;

FIG. 3 is a cross-sectional view of the composite fitting taken along line 3-3 of FIG. 2;

FIG. 4 is an isolated pictorial view of a metallic body of the composite fitting of FIG. 1;

FIG. 5 is an isolated cross-sectional view of the metallic body taken along line 3-3 of FIG. 2;

FIG. 6 is an isolated pictorial view of a polymeric body of the composite fitting of FIG. 1;

FIG. 7 is an isolated pictorial view of an o-ring of the composite fitting of FIG. 1;

FIG. 8 schematically illustrates the composite fitting of FIG. 1 connecting polymeric and metallic pipes, in accordance with the exemplary embodiment of the present invention;

FIG. 9 schematically illustrates a molding machine for manufacturing the composite fitting of FIG. 1, with the machine containing the metallic body, in accordance with the exemplary embodiment of the present invention;

FIG. 10 is an isolated, cross-sectional view of a portion of the jig of the molding machine of FIG. 9, with the cross-section taken along line 10-10 of FIG. 9;

FIG. 11 is an isolated, cross-sectional view of a portion of the jig taken along line 11-11 of FIG. 9;

FIG. 12, is a cross-sectional view of a portion of the molding machine of FIG. 9, with the machine containing the metallic body and the cross-section taken along lines 12-12 of FIG. 10;

FIG. 13 is a cross-sectional view of a composite fitting in accordance with another exemplary embodiment of the present invention;

FIG. 14 is a cross-sectional view of a portion of a composite fitting in accordance with other exemplary embodiments of the present invention;

FIG. 15 is a pictorial view of a composite fitting in accordance with another embodiment of the present invention;

FIG. 16 is a cross-sectional view of the composite fitting of FIG. 15 taken along line 16-16 of FIG. 15; and FIG. 17 is a cross-sectional view of the composite fitting of FIG. 15 taken along line 17-17 of FIG. 15.

DETAILED DESCRIPTION OF THE INVENTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

FIG. 1-3 illustrate a composite fitting 20 that is suitable for connecting between pieces of plumbing such as, but not limited to, polymeric and metallic pipes, in accordance with an exemplary embodiment of the present invention. Although the composite fitting 20 is often described herein in the context of connecting between polymeric and metallic pipes, the composite fitting 20 has other uses that are not limited to connecting between polymeric and metallic pipes. As one example, rather than being connected to a metallic pipe, the fitting 20 can be connected to other devices that can have metallic threads, such as valves, fittings or other pieces of plumbing, or the like, that can be associated with plumbing fixtures or appliances. Those of ordinary skill in the art will understand that there are a wide variety of uses for the composite fitting 20; and the present invention is not intended to be limited to the embodiments described herein.

The composite fitting 20 includes a polymeric body 22 that is preferably molded into and fixedly connected to a metallic body 24, and the bodies are preferably coaxial. The polymeric body 22 can consist essentially of polymeric material, and the metallic body 24 can consist essentially of metallic material. The polymeric body 22 is preferably fixed to the metallic body 24 by conforming to the internal surface of the metallic body, as will be discussed in greater detail below. It is preferred for the metallic body 24 to extend around the polymeric body 22, so that the metallic body advantageously reinforces the polymeric body.

The polymeric body 22 extends around and is preferably contiguous with (e.g., contacts/defines) a portion of a passageway 26 that extends through the composite fitting 20, and the polymeric body defines a forward opening 28 to the passageway 26. The forward opening 28 is preferably part of a receptacle of the composite fitting 20 that is for internally receiving the polymeric pipe, as will be discussed in greater detail below. Similarly, and as best understood with reference to FIG. 3, the metallic body 24 extends around and is preferably contiguous with (e.g., contacts/defines) a portion of the passageway 26 of the composite fitting 20, and the metallic body 24 defines a rearward opening 30 to the passageway 26. As illustrated in FIGS. 1-3, the rearward opening 30 is part of an open plug portion 32 of the metallic body 24 that is for externally receiving the metallic pipe. The plug 32 preferably includes an external spiral thread 34 for connecting the plug to the metallic pipe, or the like, by twisting, as will be discussed in greater detail below. On the other hand, the thread 34 can be omitted and the connection can be facilitated by other means. As illustrated in FIGS. 1-3, the forward opening 28 and the rearward opening 30 are the only openings to the passageway 26.

As best understood with reference to FIGS. 1, 2 and 4, the metallic body 24 preferably includes an outer polygonal portion 36, which is preferably hexagonal, for being engaged by a wrench, to facilitate twisting of the composite fitting 20 for installation purposes, as will be discussed in greater detail below. As best understood with reference to FIG. 5, which is an isolated cross-sectional view of the metallic body 24, it includes annular, outwardly extending, forward and rearward cavities or grooves 38, 40 that respectively include annular, outwardly extending shoulders which encircle, and preferably extend perpendicularly with respect to, the central axis of the metallic body. As best understood with reference to FIG. 4, it is preferred for a cylindrical hole 42 to extend through a cylindrical sidewall 44 of the metallic body 24. The hole 42 preferably extends radially away from the central axis of the metallic body 24. That is, the hole 42 preferably extends angularly away from the passageway 26 through the composite fitting, and most preferably an angle of about 90 degrees is defined between central axes of the hole and the passageway.

As best understood with reference to FIG. 6, which is an isolated view of the polymeric body 22, it preferably includes a generally cylindrical, annular midportion 46. Annular, outwardly extending, forward and rearward protrusions 48, 50 are at opposite ends of the midportion 46/polymeric body 22. The protrusions 48, 50 respectively include annular, outwardly extending shoulders that encircle, and preferably extend perpendicularly with respect to, the central axis of the polymeric body 22. The polymeric body 22 further includes a protrusion or stub 52 that extends outwardly from the outer surface of the midportion 46. The stub is preferably cylindrical and extends radially away from the polymeric body 22.

The forward protrusion 48 of the polymeric body 22 includes a forward end face 54 that faces away from the metallic body 24, and extends around and defines the forward opening 28. As illustrated in FIGS. 1 and 3, the end face 54 is at least about flush with the adjacent end of the metallic body 24, and preferably the end face and the adjacent end of the metallic body are substantially flush. In accordance with the exemplary embodiment of the present invention, the surface area of the forward end face 54 is sufficiently broad so that it can be molded to include, or otherwise marked to include, indicia (e.g., letters, numbers, symbols and/or other markings for conveying information). As illustrated in FIG. 2, exemplary indicia 56 of the forward end face 54 can be seen in an end elevational view of the composite fitting 20.

Referring to FIG. 6, the rearward protrusion 50 of the polymeric body 22 includes a rearward end face 58 that faces one of the shoulders of the metallic body 24 and is hidden from view in the assembled configuration of the composite fitting 20. In accordance with the exemplary embodiment of the present invention, the rearward protrusion 50 includes an outwardly open, annular groove 60 that, together with the rearward groove 40 (FIG. 5) of the metallic body 24, contains/encases a polymeric o-ring 61 (FIG. 7) in the assembled configuration of the composite fitting 20. In accordance with an alternative embodiment of the present invention, the o-ring 61 is omitted.

The assembled configuration of the composite fitting 20 can be best understood with reference to FIGS. 1 and 3, and with occasional reference also to FIGS. 5 and 6. Relative movement between the bodies 22, 24 is advantageously restricted by virtue of the contact between the bodies, with that contact resulting from the polymeric body having been molded into the metallic body. For example, the protrusions 48, 50 (FIG. 6) of the polymeric body 22 respectively extend into the grooves 38, 40 (FIG. 5) of the metallic body 24, so that the shoulders of the protrusions and grooves respectively engage one another in a manner that restricts relative movement between the bodies at least in the axial direction. Likewise, the stub 52 (FIGS. 1, 3 and 6) of the polymeric body 22 closes and occupies (e.g., plugs) the hole 42 (FIGS. 1 and 4) of the metallic body 24 in a manner that restricts relative movement between the bodies in the axial direction. The stub 52 can substantially fill the hole 42. In addition, the stub 52 occupies the hole 42 in a manner that restricts relative rotation between the bodies 22, 24 about the central axis of the composite fitting 20. That is, in accordance with the exemplary embodiment of the present invention, the polymeric and metallic bodies 22, 24 are connected to one another without requiring that the metallic body be bent for facilitating this connection; therefore, the composite fitting 20 is advantageously not weakened by the connecting. In accordance with alternative embodiments of the present invention, one or more of the stub 52, hole 42, grooves 38 and 40, and protrusions 48 and 50 are omitted, and it is within the scope of the present invention for other contact between the polymeric and metallic bodies 22, 24 to restrict undesired relative movement therebetween.

As shown in FIGS. 2 and 3, in accordance with the exemplary embodiment of the present invention, the polymeric body 22 further includes an annular, inwardly extending protrusion 62 having annular shoulders which encircle, and preferably extend perpendicularly with respect to, the central axis of the composite fitting 20. One of the shoulders of the protrusion 62 functions as a stop for engaging an end of a polymeric pipe inserted into the forward opening 28. The stop feature of the protrusion 62 is for arresting relative movement between the polymeric pipe and the composite fitting 20. The other shoulder of the protrusion 62 is for engaging a corresponding shoulder of the metallic body 24 for reinforcing the protrusion 62 and for further securing the bodies 22, 24 to one another. In accordance with an alternative embodiment of the present invention, the inwardly extending protrusion 62 can be omitted and/or replaced with another component that functions as a backstop for the polymeric pipe.

As best understood with reference to FIG. 3, in accordance with the exemplary embodiment of the present invention, the length L1 of the polymeric body 22 is less than the length L2 of the metallic body 24. Preferably the length L1 is about 33% to about 67% of the length L2, and most preferably the length L1 is about 43% of the length L2. Also in accordance with the exemplary embodiment of the present invention, the plug portion 32 of the metallic body 24 has a smaller outer diameter than the remainder of the metallic body. As a result, an outer and outwardly extending annular shoulder 63 of the metallic body 24 can function as a stop for engaging an end of a metallic pipe or fitting installed onto the plug portion 32, for arresting relative movement between the composite fitting 20 and the metallic pipe or fitting.

FIG. 8 schematically illustrates a coupling, which includes the composite fitting 20 and a metallic fitting 64, connecting a polymeric pipe 66 and a metallic pipe 68 so that they are in fluid communication with one another, in accordance with the exemplary embodiment of the present invention. In accordance with one example of the exemplary embodiment of the present invention, the metallic pipe 68 is connected to the metallic fitting 64 in a conventional manner, such as by soldering, or the like. In FIG. 8, the metallic pipe 68 is partially illustrated by broken lines as extending into an opening of a passageway that extends through the metallic fitting 64. The metallic pipe 68 and the metallic fitting 64 can be together referred to as a metallic pipe. For the embodiment illustrated in FIG. 8, an opening of the passageway that extends through the metallic fitting 64 includes internal threads 70 that are hidden from view and are, therefore, schematically illustrated by broken lines in FIG. 8. The external threads 34 (FIGS. 1 and 3-5) of the composite fitting 20 are threaded into the internal threads 70 of the metallic fitting 64 by relatively twisting the fittings. Accordingly, broken lines in FIG. 8 illustrate the composite fitting 20 extending into the passageway that extends through the metallic fitting 64.

As alluded to previously, the composite fitting 20 can be connected to items other than the metallic fitting 64 and metallic pipe 68. For example, other plumbing items can be connected to the composite fitting 20 in place of the metallic fitting 64 and metallic pipe 68. As one example, the threads 34 of the composite fitting 20 can be mated with metallic threads of valves, fittings or other pieces of plumbing, or the like, that can be associated with plumbing fixtures or appliances. Those of ordinary skill in the art will understand that there can be a wide variety of uses for the composite fitting 20.

An end of the polymeric pipe 66 is inserted into the forward opening 28 (FIGS. 1-3) of the composite fitting 22 and secured therein by way of solvent welding, adhesives, or the like. Broken lines in FIG. 8 illustrate the polymeric pipe 66 extending into the forward opening 28 of the composite fitting 20. Although not illustrated in the figures, and as best understood with reference to FIGS. 1 and 6, it is preferred for the entirety of the annular edge of the polymeric body 22 that defines the forward opening 28 (e.g., the edge of the of the polymeric body 22 which is located at the inner periphery of the forward end face 54) to be slightly rounded or chamfered in a manner which facilitates insertion of the pipe 66 into the forward opening 28.

In accordance with the exemplary embodiment of the present invention, the metallic body 24 is brass, or the like, and the metallic pipe 68 is copper, or the like. In accordance with alternative embodiments of the present invention, the metallic body 24 and metallic pipe 68 are constructed of other metals, and they can include, or be constructed of, materials other than metals. In accordance with the exemplary embodiment of the present invention, the polymeric body 22 and the polymeric pipe 66 are chlorinated polyvinyl chloride (CPVC), or the like. In accordance with alternative embodiments of the present invention, the polymeric body 22 and pipe 66 are constructed of polymers other than CPVC, and they can include, or be constructed of, materials other than polymers.

FIG. 9 schematically illustrates a portion of a molding machine 72 for forming the composite fittings 20, in accordance with the exemplary embodiment of the present invention. It is preferred for the molding machine 72 to manufacture multiple of the composite fittings 20 simultaneously; however, and for purposes of clarifying this disclosure, only a representative portion of the molding machine 72 is illustrated in FIG. 9. As schematically illustrated in FIG. 9, the machine 72 includes an actuator 74 for moving a mold insert 76 relative to a jig 78. The actuator 74 moves the mold insert 76 between a molding configuration and a loading configuration. As will be discussed in greater detail below, the composite fitting 20 is formed during the molding configuration. In contrast, the loading configuration is for loading and unloading, as will be discussed in greater detail below. FIG. 9 schematically illustrates the molding configuration, in which the metallic body 24 is hidden from view within the closed jig 78, and a portion of the mold insert 76 is hidden from view within the jig and the metallic body; and these hidden from view items are schematically illustrated by broken lines in FIG. 9.

FIGS. 10 and 11 are partial, isolated, cross-sectional views of the jig 78, in its closed configuration, respectively taken along lines 10-10 and 11-11 of FIG. 9. FIGS. 10 and 11 illustrate that the openable and closable jig 78 includes opposite halves. The opposite halves of the jig 78 are closed/locked together during the molding configuration of the molding machine 72, and they are unlocked/separated from one another during the loading configuration of the molding machine. When closed/locked together, the opposite halves of the jig 78 together define a receptacle 80 for initially holding a metallic body 24 and subsequently holding a composite fitting 20 formed by molding a polymeric body 22 into the metallic body being held. In accordance with the exemplary embodiment of the present invention, the receptacle 80 of the jig includes adjacent polygonal and cylindrical envelopes that are respectively illustrated in FIGS. 10 and 11. The polygonal envelope of FIG. 11 is most preferably hexagonal and is for closely engaging and extending around the hexagonal portion 36 (FIGS. 1 and 2) of the metallic body 24. The cylindrical envelope of FIG. 10 is for closely engaging and extending around the outer surface of the cylindrical sidewall 44 (FIGS. 1-3) of the metallic body 24.

Referring to FIG. 10, the receptacle 80 is for holding the metallic body 24 in a predetermined position so that the hole 42 (FIGS. 1 and 4) in the sidewall 44 of the metallic body is aligned with a gate 82 (e.g. passageway for supplying molding material) of the jig 78 during the molding configuration. Referring to FIG. 9, the gate 82 is in fluid communication with conventional equipment 84 for providing molding material under pressure, and the gate is for injecting the molding material into the hole 42. The gate 82 and portions of a supply channel 86 connecting the gate to the equipment 89 that is the source of molding material are hidden from view in FIG. 9; therefore, broken lines illustrate them.

The molding configuration is partially illustrated in FIG. 12, which is a cross-sectional view taken along line 12-12 of FIG. 10 and is illustrative of the jig 78 in its open configuration, in accordance with the exemplary embodiment of the present invention. In the molding configuration, the metallic body 24 is held in the predetermined configuration in the jig 78 and the mold insert 76 is in the passageway through the metallic body 24 so that an annular chamber 88 is defined between the metallic body and the mold insert. The metallic body 24 extends around the chamber 88 and the chamber 88 extends around the mold insert 76. At the same time, the mold insert 76 annularly engages surfaces of the metallic body 24 so that the chamber 88 is substantially closed, except for being in communication with the gate 82. In accordance with the exemplary embodiment of the present invention, the mold insert 76 generally resembles a cylindrical rod that is tapered in somewhat of a stepped fashion so as to include a predetermined arrangement of annular bevels and shoulders. The cross-section of the mold insert 76 that is illustrated in FIG. 12 is preferably representative of all straight cross-sections that can be taken through and perpendicular to the central axis of the mold insert. Although it is preferred for the metallic body 24 to contain the o-ring 61 (FIGS. 3 and 7) during the molding of the polymeric body 22, the o-ring is omitted from FIG. 12 to clarify the view.

During the molding configuration illustrated in FIG. 12, the molding material (e.g., liquid CPVC) is injected into the chamber 88 via the gate 82 and the hole 42, so that the hole 42 functions as an injection point by way of which the molding material is introduced into the chamber 88. This injecting is carried out so that the chamber 88 and hole 42 are preferably completely filled, and then the molding material in the chamber 88 is allowed to solidify, so that it becomes the rigid polymeric body 22. That is, the polymeric body 22 is preferably formed in the metallic body 24 by injection molding. As will be discussed in greater detail below, it is preferred for the molding material to be injected with sufficient pressure and/or under other conditions so that the o-ring 61 is compressed in a radially outward direction during the injection molding, so that the o-ring can, if required, subsequently expand and contract to compensate for any differences in the expansion and contraction of the polymeric and metallic bodies 22, 24 and thereby enhance leak-proof functioning of the composite fitting 20. The molding machine 84 is transitioned to the loading configuration after the injection molding.

In the loading configuration of the molding machine 24, the mold insert 76 has been withdrawn preferably at least from the receptacle 80 (FIGS. 10 and 11) of the jig 78. Then, the jig 78 can be opened and the composite fitting 20 can be removed from the jig. In accordance with the exemplary embodiment of the present invention, breaking the composite fitting 20 away from the polymeric material that solidified in the gate 82 and channel 86 completes fabrication of the composite fitting. That is, an annular shoulder/face 91 (FIG. 12) of the mold insert 76 preferably includes indicia (not shown) so that the indicia 56 (FIG. 2) of the composite fitting 20 is formed during molding of the polymeric body 22. Solidified polymeric material in the gate 82 and supply channel 86 is preferably cleared prior to forming the next composite fitting 20. Then, a metallic body 24 can be placed in the receptacle 80 of the jig 78 and the molding machine 84 can be returned to the molding configuration.

As best understood with reference to FIG. 3, the hole 42 in the sidewall 44 of the metallic body 24 is preferably positioned farther from the forward end face 54 of the polymeric body 22 than from the hidden, rearward end face 58 of the polymeric body. This advantageously helps to ensure that the polymeric body 22 is fully and properly formed within the metallic body 24. That is, from a quality control standpoint, a visual confirmation that the readily viewable forward end face 54 of the polymeric body 22 is fully formed should advantageously also serve as a confirmation that the hidden, rearward end face 58 and other portions of the polymeric body are fully formed, since the hole 42 is closer to the rearward end face than it is to the forward end face. In accordance with alternative embodiments of the present invention, the hole 42 is arranged differently, and it is possible that the hole 42 could be omitted, such as by including the gate 82 (FIGS. 9 and 12) in the mold insert 76 rather than the jig 78.

FIG. 13 is a cross-sectional view of a composite fitting 20' that is like the composite fitting 20 described with reference to FIGS. 1-12, except that the composite fitting 20' of FIG. 13 includes an internally threaded receptacle 90 for internally connecting the composite fitting 20' to a metallic pipe or fitting. The threading of the internally threaded receptacle 90 terminates proximate an inner and inwardly extending annular shoulder 92. The shoulder 92 can function as a stop for engaging an end of a metallic pipe or fitting installed into the receptacle 90, for arresting relative movement between the composite fitting 20' and the metallic pipe or fitting.

FIG. 14 is a cross-sectional view of a portion of a composite fitting 20" that is, in accordance with a first embodiment of the present invention, like the composite fitting 20 described with reference to FIGS. 1-12, and that is, in accordance with a second embodiment of the present invention, like the composite fitting 20' of FIG. 13, except that for each of these first and second embodiments, the metallic body 24" further includes an axial groove 94 which is occupied by an axial protrusion 96 of the polymeric body 22". Each of the axial groove 94 and the axial protrusion 96 encircles and extends preferably parallel to the central axis of the metallic body 24". As illustrated in FIG. 14, the axial groove 94 includes a pair of shoulders that are radially spaced apart from one another, and that are each coaxial with the central axis of the composite fitting 20". Accordingly, in accordance with the first and second embodiments of the present invention, the metallic body 24" includes annular grooves that extend nonparallel to one another, the polymeric body 22" includes annular protrusions that extend nonparallel to one another, and the protrusions are respectively positioned in the grooves in a manner which seeks to stabilize the composite fittings/allow the composite fittings to function optimally.

FIGS. 15-17 illustrate a composite fitting 20''' in accordance with another embodiment of the present invention. The composite fitting 20''' is like the composite fitting of the second embodiment of the present invention except that the metallic body 24''' of the composite fitting 20''' is modified. The metallic body 24''' is angled, such as to define a 90° angle, so that the composite fitting 20''' is in the form of an elbow. That is, the portions of the passageway 26''', which respectively include the openings 28 and 30''', respectively extend around axes, and an angle is defined between these axes, such as angle of 90°. Other angles are also within the scope of the present invention. Also, the metallic body 24''' includes ears or lobes 100 that are generally of the type that are included in conventional drop ear elbows. A hole 102 extends completely through each of the lobes 100. Fasteners, such as nails or screws, can be inserted through the holes 102 for the purpose of mounting the composite fitting 20''' to a reference structure, such as a stud or other structural component of a building, or the like. Also, the metallic body 24''' optionally includes an annular flange 98 that encircles the opening 30'''. As illustrated in FIGS. 15-17, the metallic body 24''' does not include the outer polygonal portion 36 (e.g., see FIG. 1), but the metallic body 24''' can optionally include the outer polygonal portion 36.

In accordance with exemplary embodiments of the present invention, feature(s) of the composite fittings advantageously operate in a manner which seeks stabilize the composite fittings/allow the composite fittings to function in a leak-proof manner for very many years, even if exposed to many extreme cycles of stress, such as may be caused by variations in the pressure and/or temperature of the water or other medium passing through the composite fittings. In this regard, and for example, it is preferred to incorporate the o-ring 61 as described above, because it can perform a sealing function that negates effects of different coefficients of expansion between the metallic and polymeric bodies. In this regard, it is believed that the functionality of the o-rings 61 can be enhanced by compressing (e.g., "flattening") the o-rings in a radially outward direction when molding the polymeric bodies into the metallic bodies, so that the o-rings can, if required, subsequently expand and contract to compensate for any differences in the expansion and contraction of the metallic and polymeric bodies.

Such compressing of the o-rings 61 during manufacture can be enhanced, for example, by decreasing their modulus of elasticity, such as by preheating the o-rings. As an additional example, the molding material (e.g., see the source of molding material 84 in FIG. 9) can be injected in a manner that enhances the compressing of the o-rings 61, such as by injecting the molding material at higher pressures, increasing the duration of the injecting, or making the pressure gradient of the injected molding material more uniform. As one example, and as best understood with reference to FIGS. 9 and 10, which only show one gate 82 per receptacle 80, it may be possible to achieve a more uniform pressure gradient by injecting the molding material into each receptacle through more than one gate, such as via two gates which are diametrically opposed, or the like.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A pipe fitting for connecting between a metal piece of plumbing and a polymer piece of plumbing, the pipe fitting comprising:
a metal body having a tubular first end defining a first opening and an opposite tubular second end defining a second opening spaced from the first opening, the metal body in part defining a passage extending through the pipe fitting from the first opening to the second opening, wherein the second opening is part of a receptacle for internally receiving a metal piece of plumbing, and the receptacle includes at least one internal spiral thread for connecting the pipe fitting to the metal piece of plumbing by twisting;
a tubular one-piece polymeric body molded within the first end of the metal body, the polymeric body having a radially outer surface molded against a radially inner surface of the metal body and having a radially inner surface that in part defines the passage and that is for mating with a polymer piece of plumbing;
wherein the metal body defines an aperture extending from the radially inner surface of the metal body to a radially outer surface thereof, through which polymer material is injected for molding the polymeric body within the metal body, and wherein a portion of the polymeric body extends into the aperture; and
the polymeric body has a shorter length than the metal body such that the metal body has an end part that extends beyond the polymeric body and defines a metallic inner surface and a metallic outer surface that are both exposed, said metallic inner surface surrounding the second opening and defining the receptacle and the at least one internal spiral thread for being mated to a metal piece of plumbing.

2. A pipe fitting according to claim 1, wherein an end of the polymeric body is flush with the first end of the metal body.

3. A pipe fitting according to claim 1, wherein the metal body includes an outer polygonal portion for being engaged by a wrench.

4. A pipe fitting according to claim 1, wherein the first and second openings are at opposite ends of the pipe fitting.

5. A pipe fitting according to claim 1, wherein the first opening is part of a receptacle for internally receiving the polymer piece of plumbing.

6. A pipe fitting according to claim 1, wherein the polymeric body includes an end that is proximate the first end of the metal body and that includes indicia that is seen in an elevational view of the first opening.

7. A pipe fitting according to claim 1, wherein the polymeric body includes annular grooves, the metal body includes annular protrusions, and the protrusions are respectively positioned in the grooves.

8. A pipe fitting according to claim 1, wherein the polymeric body includes opposite first and second ends, the first end is proximate the first opening, and the second end is positioned between the first and second openings and engages an inwardly extending annular shoulder of the metal body.

9. A pipe fitting according to claim 1, wherein the metal body defines an annular groove that extends around the passage and is at least partially occupied by an outwardly extending annular protrusion of the polymeric body.

10. A pipe fitting according to claim 9, further comprising an o-ring that is contained in the annular groove.

11. A pipe fitting according to claim 1, wherein the polymeric body includes an end that is proximate the first opening to the passageway and includes an outwardly extending annular protrusion having opposite and annular first and second sides, with the first side engaging the metal body and the second side facing away from the metal body.

12. A pipe fitting according to claim 11, wherein the second side includes indicia that is seen in an elevational view of the first opening.

13. A pipe fitting according to claim 11, wherein the metal body defines an annular groove that extends around the passage and is at least partially occupied by the protrusion.

14. A pipe fitting according to claim 1, wherein the aperture in the metal body is positioned between and distant from the first and second ends of the metal body.

15. A pipe fitting according to claim 14, wherein the aperture extends angularly away from the passage.

16. A pipe fitting for connecting between a metal piece of plumbing and a polymer piece of plumbing, the pipe fitting comprising:
a metal body having a tubular first end defining a first opening and an opposite tubular second end defining a second opening spaced from the first opening, the metal body in part defining a passage extending through the pipe fitting from the first opening to the second opening;
a tubular one-piece polymeric body molded within the first end of the metal body, the polymeric body having a radially outer surface molded against a radially inner surface of the metal body and having a radially inner surface that in part defines the passage and that is for mating with a polymer piece of plumbing;
wherein the metal body defines an aperture extending from the radially inner surface of the metal body to a radially outer surface thereof, through which polymer material is injected for molding the polymeric body within the metal body, and wherein a portion of the polymeric body extends into the aperture;
wherein the polymeric body has a shorter length than the metal body such that the metal body has an end part that extends beyond the polymeric body and defines a metallic inner surface and a metallic outer surface that are both exposed, said metallic inner surface surrounding the second opening; and
wherein the end part defining the second opening is part of an open plug for externally receiving the metal piece of plumbing, and the open plug includes at least one external spiral thread for connecting the plug to the metal piece of plumbing by twisting.

17. A coupling, comprising:
a pipe fitting including:
a metal body having a tubular first end defining a first opening and an opposite tubular second end defining a second opening spaced from the first opening, the metal body in part defining a passage extending through the pipe fitting from the first opening to the second opening;
a tubular one-piece polymeric body molded within the first end of the metal body, the polymeric body having a radially outer surface molded against a radially inner surface of the metal body and having a radially inner surface that in part defines the passage and that is for mating with a polymer piece of plumbing;
wherein the metal body defines an aperture extending from the radially inner surface of the metal body to a radially outer surface thereof, through which polymer material is injected for molding the polymeric body within the metal body, and wherein a portion of the polymeric body extends into the aperture;
the polymeric body has a shorter length than the metal body such that the metal body has an end part that extends beyond the polymeric body and defines a metallic inner surface and a metallic outer surface that are both exposed, said metallic inner surface surrounding the second opening, said end part having a spiral thread; and a metal piece of plumbing having a passageway extending between first and second openings of the metal piece of plumbing, wherein the second opening of the metal piece of plumbing is for being mated to the second opening of the pipe fitting, and the metal piece of plumbing includes at least one spiral thread that is proximate the second opening of the metal piece of plumbing, wherein the thread of the end part of the pipe fitting and the thread of the metal piece of plumbing are for being engaged to one another and connecting the second opening of the pipe fitting to the second opening of the metal piece of plumbing by twisting.

18. A coupling according to claim 17, wherein the first opening of the metal piece of plumbing is for being mated to a metallic pipe.

19. A coupling according to claim 17, wherein an end of the polymeric body is proximate the first opening of the metal body of the pipe fitting, and the end of the polymeric body is at least about flush with the first end of the metal body.

20. A coupling according to claim 17, wherein the aperture is positioned between and distant from the first and second ends of the metal body.

* * * * *